(12) United States Patent
Rungta et al.

(10) Patent No.: US 11,941,643 B2
(45) Date of Patent: Mar. 26, 2024

(54) SYSTEM, METHOD, AND APPARATUS FOR AUTHENTICATING A USER

(71) Applicant: Visa International Service Association, San Francisco, CA (US)

(72) Inventors: Aditi Rungta, Singapore (SG); Kieu Trinh Nguyen, Singapore (SG); Wen Zhao Cheng, Singapore (SG); Xi Li, Singapore (SG); Xudong Wu, Singapore (SG)

(73) Assignee: Visa International Service Association, San Francisco, CA (US)

( * ) Notice: Subject to any disclaimer, the term of this patent is extended or adjusted under 35 U.S.C. 154(b) by 23 days.

(21) Appl. No.: 17/045,206

(22) PCT Filed: Apr. 1, 2019

(86) PCT No.: PCT/US2019/025136
§ 371 (c)(1),
(2) Date: Oct. 5, 2020

(87) PCT Pub. No.: WO2019/195143
PCT Pub. Date: Oct. 10, 2019

(65) Prior Publication Data
US 2021/0042764 A1    Feb. 11, 2021

Related U.S. Application Data

(60) Provisional application No. 62/653,062, filed on Apr. 5, 2018.

(51) Int. Cl.
*G06Q 30/018* (2023.01)
*H04L 9/40* (2022.01)
*G06Q 40/03* (2023.01)

(52) U.S. Cl.
CPC ......... *G06Q 30/0185* (2013.01); *G06Q 40/03* (2023.01); *H04L 63/083* (2013.01); *H04L 63/0853* (2013.01); *H04L 63/0884* (2013.01)

(58) Field of Classification Search
CPC .............. G06Q 30/0185; G06Q 40/025; H04L 63/0853; H04L 63/0884
See application file for complete search history.

(56) References Cited

U.S. PATENT DOCUMENTS 6,658,091 B1 * 12/2003 Naidoo .................. H04M 11/04
379/37
9,338,007 B1 * 5/2016 Doshi ................. H04L 63/0815
(Continued)

OTHER PUBLICATIONS

Electronic Authentication Guideline, NIST Special Publication (SP) 800-63-2, Aug. 2013, Available at: https://nvlpubs.nist.gov/nistpubs/specialpublications/nist.sp.800-63-2.pdf (Year: 2013).*
(Continued)

*Primary Examiner* — Gregory Harper
(74) *Attorney, Agent, or Firm* — THE WEBB LAW FIRM

(57) ABSTRACT

Provided is a computer-implemented method for authenticating a user. The method includes registering a plurality of user accounts for a plurality of users based at least partially on user information and account data for each user of the plurality of users, the account data for each user including an account identifier associated with a portable payment device, generating an identity score for each user, registering a plurality of provider accounts for a plurality of third-party service providers based at least partially on third-party service provider data, receiving a request to authenticate a user of the plurality of users, receiving user credentials corresponding to a user account of the user, validating the user credentials based at least partially on the identity score
(Continued)

of the user, and communicating an authentication response message to the third-party system in response to validating the user credentials.

19 Claims, 7 Drawing Sheets

(56) References Cited

U.S. PATENT DOCUMENTS

| | | | | |
|---|---|---|---|---|
| 9,603,023 | B2* | 3/2017 | Ferguson | H04W 4/02 |
| 9,674,205 | B2* | 6/2017 | Kirkham | G06F 21/31 |
| 11,252,190 | B1* | 2/2022 | Sharifi Mehr | H04L 63/10 |
| 2002/0172345 | A1* | 11/2002 | Wu | H04M 3/42229 |
| | | | | 379/221.13 |
| 2003/0149781 | A1* | 8/2003 | Yared | H04L 63/0815 |
| | | | | 709/228 |
| 2003/0200184 | A1* | 10/2003 | Dominguez | G07F 7/10 |
| | | | | 705/78 |
| 2005/0246278 | A1* | 11/2005 | Gerber | G06Q 20/02 |
| | | | | 705/44 |
| 2006/0080546 | A1* | 4/2006 | Brannon | H04L 63/08 |
| | | | | 713/185 |
| 2010/0083386 | A1* | 4/2010 | Kline | G01R 31/31705 |
| | | | | 726/34 |
| 2010/0174620 | A1* | 7/2010 | Stringfellow | G06Q 30/0601 |
| | | | | 705/26.1 |
| 2011/0154465 | A1* | 6/2011 | Kuzin | H04L 67/08 |
| | | | | 726/9 |
| 2011/0178925 | A1* | 7/2011 | Lindelsee | G06Q 20/3829 |
| | | | | 705/44 |
| 2011/0276493 | A1 | 11/2011 | Graham et al. | |
| 2012/0102548 | A1* | 4/2012 | Tamura | G06F 21/31 |
| | | | | 726/4 |
| 2012/0215918 | A1* | 8/2012 | Vasters | H04L 67/02 |
| | | | | 709/226 |
| 2015/0066768 | A1* | 3/2015 | Williamson | G06Q 20/4097 |
| | | | | 705/44 |
| 2015/0227725 | A1* | 8/2015 | Grigg | H04L 63/126 |
| | | | | 726/7 |
| 2015/0269701 | A1 | 9/2015 | Malhotra et al. | |
| 2015/0356560 | A1* | 12/2015 | Shastry | G06Q 20/38215 |
| | | | | 705/64 |
| 2016/0004852 | A1* | 1/2016 | McEvoy | H04L 63/08 |
| | | | | 726/7 |
| 2016/0065563 | A1* | 3/2016 | Broadbent | H04L 63/0281 |
| | | | | 726/9 |
| 2016/0080381 | A1* | 3/2016 | Hall | H04L 63/0838 |
| | | | | 726/7 |
| 2016/0253521 | A1* | 9/2016 | Esmailzadeh | G06F 21/602 |
| | | | | 726/4 |
| 2016/0359629 | A1* | 12/2016 | Nadathur | H04L 12/6418 |
| 2016/0378549 | A1* | 12/2016 | Irish | H04L 67/1002 |
| | | | | 718/107 |
| 2017/0024733 | A1 | 1/2017 | Purves | |
| 2017/0068939 | A1* | 3/2017 | Groarke | G06Q 20/20 |
| 2017/0070484 | A1* | 3/2017 | Kruse | H04L 63/0442 |
| 2017/0109747 | A1* | 4/2017 | Mohamed | G06Q 20/20 |
| 2017/0124566 | A1 | 5/2017 | Thornton et al. | |
| 2017/0195336 | A1* | 7/2017 | Ouellette | H04L 63/102 |
| 2017/0230825 | A1* | 8/2017 | Counterman | H04L 63/0876 |
| 2017/0244727 | A1* | 8/2017 | Thomas | G06Q 20/10 |
| 2017/0272413 | A1 | 9/2017 | Adams et al. | |
| 2017/0289197 | A1* | 10/2017 | Mandyam | H04L 63/10 |
| 2017/0374058 | A1* | 12/2017 | Horiuchi | H04W 12/08 |
| 2018/0026962 | A1* | 1/2018 | Kaladgi | G06F 21/30 |
| | | | | 713/159 |
| 2018/0062856 | A1* | 3/2018 | Kaliski, Jr. | H04L 63/0823 |
| 2018/0083967 | A1* | 3/2018 | Subramanian | H04L 63/20 |
| 2018/0197214 | A1* | 7/2018 | Rokde | G06Q 30/04 |
| 2018/0205725 | A1* | 7/2018 | Cronkright | H04L 9/0637 |
| 2018/0276041 | A1* | 9/2018 | Bansal | G06F 11/3006 |
| 2018/0278603 | A1* | 9/2018 | Yabe | H04L 63/0892 |
| 2018/0288047 | A1* | 10/2018 | Zhang | H04L 63/0807 |
| 2018/0337914 | A1* | 11/2018 | Mohamad Abdul | H04L 9/12 |
| 2019/0020480 | A1* | 1/2019 | Camenisch | H04L 9/3263 |
| 2019/0197537 | A1* | 6/2019 | Desai | G06Q 20/385 |
| 2019/0207772 | A1* | 7/2019 | Hecht | H04L 63/10 |
| 2019/0251241 | A1* | 8/2019 | Bykampadi | G06F 21/604 |
| 2019/0253255 | A1* | 8/2019 | Mani | G07C 9/00 |
| 2019/0334718 | A1* | 10/2019 | Li | H04W 12/0471 |
| 2020/0145212 | A1* | 5/2020 | Tsuchida | H04L 9/3213 |
| 2020/0211002 | A1* | 7/2020 | Steinberg | H04L 9/3213 |
| 2020/0259652 | A1* | 8/2020 | Schmaltz, III | H04L 9/30 |
| 2020/0304486 | A1* | 9/2020 | de Ganon | G06Q 20/38215 |
| 2020/0336310 | A1* | 10/2020 | Jain | H04L 63/105 |
| 2021/0233078 | A1* | 7/2021 | Vittimberga | H04L 63/0876 |

OTHER PUBLICATIONS

Hardt, "The OAuth 2.0 Authorization Framework", Internet Engineering Task Force (IETF), RFC 6749, Oct. 2012, 77 pages.
Jones et al., "JSON Web Token (JWT)", Internet Engineering Task Force (IETF), RFC 7519, May 2015, 31 pages.
Jones et al., "The OAuth 2.0 Authorization Framework: Bearer Token Usage", Internet Engineering Task Force (IETF), RFC 6750, Oct. 2012, 16 pages.
Leach et al., "A Universally Unique IDentifier (UUID) URN Namespace", Internet Engineering Task Force (IETF), RFC 4122, Jul. 2005, 33 pages.
"Payment Account Validation API", Visa Developer Center, https://developer.visa.com/capabilities/pav/reference#pav_pav, 5 pages.
"Platform", FICO, https://www.fico.com/en/platform, 11 pages.
"Reduce the risk of fraud by using tokens", Visa Token Service, https://developer.visa.com/capabilities/vts, 4 pages.

* cited by examiner

SYSTEM, METHOD, AND APPARATUS FOR AUTHENTICATING A USER

CROSS-REFERENCE TO RELATED APPLICATION

This application is the United States national phase of International Application No. PCT/US2019/025136 filed Apr. 1, 2019 and, claims priority to U.S. Provisional Patent Application No. 62/653,062, filed Apr. 5, 2018, the disclosures of which are hereby incorporated by reference in their entirety.

BACKGROUND

1. Technical Field

This disclosure relates generally to user authentication and, in some non-limiting embodiments or aspects, systems, methods, and apparatuses for authenticating a user based on one or more account identifiers.

2. Technical Considerations

The creation of fake online personas to commit fraud can be done within a few minutes. This makes it quite challenging for third-party services (e.g., car and house rental, trading and investments, dating, job search, etc.), which are sensitive to user identity, to conduct background checks for all its users in real-time.

With the increasing popularity of websites such as Facebook® and Google®, it is easier than ever to sign up to third-party services. Today, registering for a new account on most online services can be completed within a few seconds by using the option to "Sign In with Facebook" or "Sign In with Google." These options not only save the user from the tedious and painstaking task of filling out online forms with their personal details, but also offer a quick and easy way for the third-party services (and application developers creating systems for those third-party services) to convert a higher proportion of visitors into members/subscribers. Lazy visitors that were previously disinclined to fill out complicated online forms with numerous text fields, buttons, and checkboxes are now more likely to select the "Sign In with Facebook" or "Sign In with Google" options and become a registered user for these third-party services using existing credentials.

The online identities provided by services such as Facebook® and Google® present risks to users and third-party services relying on such verification. In particular, anyone and everyone can create an online account on applications like Facebook® and Google®. All the user needs to have is an email account and/or a phone number which has not been already registered on these services. Most of the other personal information provided by users on these websites remains unverified, opening up a plethora of possibilities for fraudsters and impostors. Moreover, those wishing to manually verify users in some other manner, such as conducting independent research, must do so in addition to and separately from using their Google® or Facebook® accounts. The repercussions of this loophole for identity theft and fraud are especially problematic for services that are particularly sensitive to user identities, such as online trading platforms, dating platforms, job search portals, "sharing economy" services (e.g., Uber®, Airbnb®, etc.), and/or the like.

SUMMARY

According to some non-limiting embodiments or aspects, provided is a computer-implemented method for authenticating a user, comprising: registering, with at least one processor, a plurality of user accounts for a plurality of users in at least one data structure based at least partially on user information and account data for each user of the plurality of users, the account data for each user comprising an account identifier associated with a portable payment device; generating, with at least one processor, an identity score for each user based on the account data for the user; registering, with at least one processor, a plurality of provider accounts for a plurality of third-party service providers in at least one data structure based at least partially on third-party service provider data; receiving, from a third-party system corresponding to a third-party service provider of the plurality of third-party service providers, a request to authenticate a user of the plurality of users; receiving, from a device associated with the user, user credentials corresponding to a user account of the user; validating, with at least one processor, the user credentials based at least partially on the identity score for the user; and in response to validating the user credentials, communicating, with at least one processor, an authentication response message to the third-party system According to some non-limiting embodiments or aspects, provided is an authentication system, comprising: an authentication database; and at least one server computer including at least one processor programmed or configured to: register a plurality of user accounts for a plurality of users in the authentication database based at least partially on user information and account data for each user of the plurality of users, the account data for each user comprising an account identifier associated with a portable payment device; generate an identify score for each user of the plurality of users based on the account data for the user; register a plurality of provider accounts for a plurality of third-party service providers in the authentication database based at least partially on third-party service provider data; receive, from a third-party system corresponding to a third-party service provider of the plurality of third-party service providers, a request to authenticate a user of the plurality of users; receive, from a device associated with the user, user credentials corresponding to a user account of the user; validate the user credentials based at least partially on the identity score of the user; and in response to validating the user credentials, communicate an authentication response message to the third-party system.

According to some non-limiting embodiments or aspects, provided is a computer program product for authenticating a user, comprising at least one non-transitory computer-readable medium including program instructions that, when executed by at least one processor, cause the at least one processor to: register a plurality of user accounts for a plurality of users in an authentication database based at least partially on user information and account data for each user of the plurality of users, the account data for each user comprising an account identifier associated with a portable payment device; generate an identity score for each user of the plurality of users based on the account data for the user; register a plurality of provider accounts for a plurality of third-party service providers in the authentication database based at least partially on third-party service provider data; receive, from a third-party system corresponding to a third-party service provider of the plurality of third-party service providers, a request to authenticate a user of the plurality of users; receive, from a device associated with the user, user credentials corresponding to a user account of the user; validate the user credentials based at least partially on the identity score; and in response to validating the user credentials, communicate an authentication response message to the third-party system.

Further non-limiting embodiments or aspects are set forth in the following numbered clauses.

Clause 1: A computer-implemented method for authenticating a user, comprising: registering, with at least one processor, a plurality of user accounts for a plurality of users in at least one data structure based at least partially on user information and account data for each user of the plurality of users, the account data for each user comprising an account identifier associated with a portable payment device; generating, with at least one processor, an identity score for each user based on the account data for the user; registering, with at least one processor, a plurality of provider accounts for a plurality of third-party service providers in at least one data structure based at least partially on third-party service provider data; receiving, from a third-party system corresponding to a third-party service provider of the plurality of third-party service providers, a request to authenticate a user of the plurality of users; receiving, from a device associated with the user, user credentials corresponding to a user account of the user; validating, with at least one processor, the user credentials based at least partially on the identity score for the user; and in response to validating the user credentials, communicating, with at least one processor, an authentication response message to the third-party system.

Clause 2: The computer-implemented method of clause 1, wherein generating the identity score for each user is based at least partially on at least one of the following: an account type, a credit score, an account usage, or any combination thereof.

Clause 3: The computer-implemented method of clauses 1 or 2, wherein generating the identity score for each user is based at least partially on an account verification score of the user, the account verification score based at least partially on at least two of the following parameters: a verified Primary Account Number, a verified security code, verified user information, or any combination thereof.

Clause 4: The computer-implemented method of any of clauses 1-3, herein generating the identity score for each user is based at least partially on a credit score of the user.

Clause 5: The computer-implemented method of any of clauses 1-4, wherein generating the identity score for each user is based at least partially on an account usage score of the user, the account usage score based at least partially on at least one of the following: a frequency of usage of a portable payment device, an amount spent with the portable payment device, an age of the portable payment device, or any combination thereof.

Clause 6: The computer-implemented method of any of clauses 1-5, wherein validating the user credentials comprises determining if the identity score for the user satisfies a threshold.

Clause 7: The computer-implemented method of any of clauses 1-6, further comprising: receiving, from the third-party system, an initial request to authenticate a user of the plurality of users, the initial request communicated in response to the user creating an account with the third-party service provider; receiving, from a device associated with the user, the user credentials corresponding to the user account of the user; validating, with at least one processor, the user credentials based at least partially on the identity score for the user; and in response to validating the user credentials, communicating a redirect message to the device associated with the user, the redirect message comprising an authentication code and configured to cause the device to be redirected to the third-party system.

Clause 8: The computer-implemented method of any of clauses 1-7, further comprising: receiving, from the third-party system, an access token request message comprising an authorization code and third-party service provider data; validating, with at least one processor, the access token request message; in response to validating the access token request message, generating, with at least one processor, an access token based at least partially on the authorization code and the third-party service provider data; and communicating the access token to the third-party system.

Clause 9: The computer-implemented method of any of clauses 1-8, wherein the request to authenticate the user is received subsequent to the initial request to authenticate the user, and wherein the request to authenticate the user comprises the access token.

Clause 10: The computer-implemented method of any of clauses 1-9, wherein the redirect message causes the authentication code to be stored by a browser application executing on the device.

Clause 11: The computer-implemented method of any of clauses 1-10, wherein the redirect message comprises a callback URL, and wherein the initial request to authenticate the user comprises the callback URL.

Clause 12: The computer-implemented method of any of clauses 1-11, wherein each account identifier comprises a token corresponding to a Primary Account Number, and wherein registering each user of the plurality of users in the at least one data structure comprises: generating the token based on the Primary Account Number; and storing the token in the at least one data structure in relation to user data.

Clause 13: An authentication system, comprising: an authentication database; and at least one server computer including at least one processor programmed or configured to: register a plurality of user accounts for a plurality of users in the authentication database based at least partially on user information and account data for each user of the plurality of users, the account data for each user comprising an account identifier associated with a portable payment device; generate an identify score for each user of the plurality of users based on the account data for the user; register a plurality of provider accounts for a plurality of third-party service providers in the authentication database based at least partially on third-party service provider data; receive, from a third-party system corresponding to a third-party service provider of the plurality of third-party service providers, a request to authenticate a user of the plurality of users; receive, from a device associated with the user, user credentials corresponding to a user account of the user; validate the user credentials based at least partially on the identity score of the user; and in response to validating the user credentials, communicate an authentication response message to the third-party system.

Clause 14: The authentication system of clause 13, wherein generating the identity score for each user is based at least partially on at least one of the following: an account type, a credit score, an account usage, or any combination thereof.

Clause 15: The authentication system of clauses 13 or 14, wherein generating the identity score for each user is based at least partially on an account verification score of the user, the account verification score based at least partially on at least two of the following parameters: a verified Primary Account Number, a verified security code, verified user information, or any combination thereof.

Clause 16: The authentication system of any of clauses 13-15, wherein generating the identity score for each user is based at least partially on a credit score of the user.

Clause 17: The authentication system of any of clauses 13-16, wherein generating the identity score for each user is based at least partially on an account usage score of the user, the account usage score based at least partially on at least one of the following: a frequency of usage of a portable payment device, an amount spent with the portable payment device, an age of the portable payment device, or any combination thereof.

Clause 18: The authentication system of any of clauses 13-17, wherein the at least one processor is further programmed or configured to: receive, from the third-party system, an initial request to authenticate the user of the plurality of users, the initial request communicated in response to the user creating an account with the third-party service provider; receive, from a device associated with the user, the user credentials corresponding to the user account of the user; validate, with at least one processor, the user credentials based at least partially on the user information and account data registered in the at least one data structure; and in response to validating the user credentials, communicate a redirect message to the device associated with the user, the redirect message comprising an authentication code and configured to cause the device to be redirected to the third-party system.

Clause 19: The authentication system of any of clauses 13-18, wherein the at least one processor is further programmed or configured to: receive, from the third-party system, an access token request message comprising an authorization code and third-party service provider data; validate the access token request message; in response to validating the access token request message, generate an access token based at least partially on the authorization code and the third-party service provider data; and communicate the access token to the third-party system.

Clause 20: The authentication system of any of clauses 13-19, wherein the request to authenticate the user is received subsequent to the initial request to authenticate the user, and wherein the request to authenticate the user comprises the access token.

Clause 21: The authentication system of any of clauses 13-20, wherein the redirect message causes the authentication code to be stored by a browser application executing on the device.

Clause 22: The authentication system of any of clauses 13-21, wherein the redirect message comprises a callback URL, and wherein the initial request to authenticate the user comprises the callback URL.

Clause 23: The authentication system of any of clauses 13-22, wherein each account identifier comprises a token corresponding to a Primary Account Number, and wherein registering each user of the plurality of users in the at least one data structure comprises: generating the token based on the Primary Account Number; and storing the token in the at least one data structure in relation to user data.

Clause 24: The authentication system of any of clauses 13-23, wherein validating the user credentials comprises determining if the identity score for the user satisfies a threshold.

Clause 25: A computer program product for authenticating a user, comprising at least one non-transitory computer-readable medium including program instructions that, when executed by at least one processor, cause the at least one processor to: register a plurality of user accounts for a plurality of users in an authentication database based at least partially on user information and account data for each user of the plurality of users, the account data for each user comprising an account identifier associated with a portable payment device; generate an identity score for each user of the plurality of users based on the account data for the user; register a plurality of provider accounts for a plurality of third-party service providers in the authentication database based at least partially on third-party service provider data; receive, from a third-party system corresponding to a third-party service provider of the plurality of third-party service providers, a request to authenticate a user of the plurality of users; receive, from a device associated with the user, user credentials corresponding to a user account of the user; validate the user credentials based at least partially on the identity score; and in response to validating the user credentials, communicate an authentication response message to the third-party system.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which.

DESCRIPTION OF THE PREFERRED EMBODIMENTS

Figure 1:
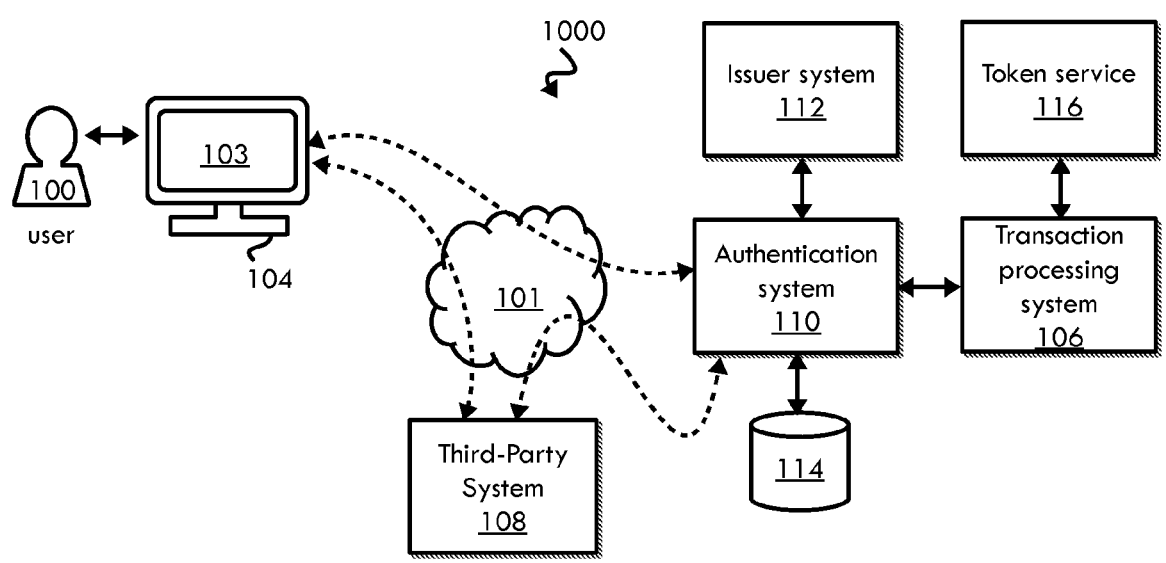
FIG. 1 is a schematic diagram of a system for authenticating a user according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

Non-limiting embodiments or aspects of the present disclosure are directed to a system, method, and computer program product for authenticating a user using account data associated with a portable payment device. In non-limiting embodiments or aspects, enhanced security and authentication are provided by a specific arrangement of system components that facilitate a transaction processing system to verify a user identity for a third-party system. As an example, a specific arrangement of an authentication system, transaction processing system, and token service, along with logic for communicating with an issuer system and registering users and third-party systems, is provided to facilitate enhanced security and authentication for both users and third-party systems. By implementing the system among user devices, third-party systems, and a transaction processing system, additional security and trust are provided. In some non-limiting embodiments or aspects, the transaction processing system and/or authentication system authenticates a user's identity to third-party systems via a user's browser application executing on a user device.

As used herein, the term "transaction service provider" may refer to an entity that receives transaction authorization requests from merchants or other entities and provides guarantees of payment, in some cases through an agreement between the transaction service provider and an issuing institution. The term "transaction service provider" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "issuer institution" may refer to one or more entities, such as a bank, that provide accounts to customers for conducting payment transactions, such as initiating credit and/or debit payments. For example, an issuer institution may provide an account identifier, such as a primary account number (PAN), to a customer that uniquely identifies one or more accounts associated with that customer. The account identifier may be embodied on a physical financial instrument, such as a payment card, and/or may be electronic and used for electronic payments. The terms "issuer institution," "issuer bank," and "issuer system" may also refer to one or more computer systems operated by or on behalf of an issuer institution, such as a server computer executing one or more software applications. For example, an issuer system may include one or more authorization servers for authorizing a payment transaction.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies it among other issuer institutions.

As used herein, a "user device" refers to any electronic device that is configured to communicate with one or more servers or remote devices and/or systems. A user device may include a mobile device, a network-enabled appliance (e.g., a network-enabled television, refrigerator, thermostat, and/or the like), a computer, a point-of-sale (POS) system, and/or any other device or system capable of communicating with a network. A mobile device may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices.

As used herein, the term "portable payment device" may refer to a payment device, an electronic payment device, a portable financial device, payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a PDA, a security card, an access card, a wireless terminal, and/or a transponder, as examples. The portable payment device may include volatile or non-volatile memory to store information, such as an account identifier or a name of the account holder.

As used herein, the terms "request," "response," "request message," and "response message" may refer to one or more messages, data packets, signals, and/or data structures used to communicate data between two or more components or units.

Referring to FIG. 1, a system 1000 for authenticating a user is shown according to some non-limiting embodiments or aspects. An authentication system 110 is in communication with a transaction processing system 106, an issuer system 112, and an authentication database 114. The authentication system 110 may include one or more processors, including but not limited to one or more server computers, and may be part of or separate from the transaction processing system 106. For example, in some non-limiting embodiments or aspects, the authentication system 110 may be a subsystem of the transaction processing system 106 and utilize one or more of the same server computers, processors, and/or the like. In some non-limiting embodiments or aspects, the authentication system 110 may be a separate system that is external to the transaction processing system 106 and issuer system 112. The authentication system may also be a subsystem of the issuer system 112. The authentication database 114 may be one or more data structures and may store user information and account data for a plurality of users. The authentication database 114 may also store third-party service provider data for a plurality of third-party service providers. The authentication database 114 may be remote from or local to the authentication system 110, transaction processing system 106, or issuer system 112.

With continued reference to FIG. 1, the authentication system 110 is also in communication with a token service 116 and a third-party system 108. The third-party system 108 may include one or more processors associated with a third-party service provider, such as but not limited to one or more third-party servers providing a service such as a social network, streaming service, investment platform, message board, email service, e-commerce platform, and/or the like. The token service 116 may be hosted by the transaction processing system 106 and/or issuer system 112, and may manage tokens that correspond to account identifiers. The authentication system 110 is also in communication with a user device 104, which is operated by a user 100 and displays one or more graphical user interfaces (GUIs) 103. The user 100 operates the user device 104 to access services from the third-party system 108 through, for example, a web browser application and/or client application executing on the user device 104.

With continued reference to FIG. 1, the user 100 utilizes the user device 104 and the GUIs 103 to access or request access to the third-party system 108. For example, the user 100 may access a website hosted by the third-party system 108 or a client application in communication with the third-party system 108 and sign-up for an account. The third-party system 108 may allow the user 100 to create an account and sign-in to the third-party system 108 using credentials established with the authentication system 110. The third-party system 108 communicates with the authentication system 110 to authenticate the user 100 by verifying the user's identity. For example, the third-party system 108 may verify that the user 100 is who the user says he/she is by requiring the user 100 to prove his or her identity.

In some non-limiting embodiments or aspects, and with continued reference to FIG. 1, a user 100 may choose to create an account for a message board offered by third-party system 108. Rather than create a new account with new credentials for the third-party system 108 for the sole purpose of accessing the message board, the user 100 may create, or may have already created, an account with authentication system 110 that may be used with multiple third-party systems. The user 100 may, for example, access the authentication system 110 through a webpage or an application on the user device 104 and, through a GUI 103 on the device 104, input user information such as email address, user name, password, address, telephone number, and/or the like. The user 100 may also provide account data to the authentication system 110 corresponding to a portable payment device held by the user 100 and issued by an issuer institution associated with issuer system 112. For example, the user 100 may input an account identifier, such as a PAN, expiration date, security code (e.g., CVV or CVV2), billing address, and/or other account data into a GUI 103. The user information, including the account data, is communicated to the authentication system 110 for creating an authentication system account for the user.

Still referring to FIG. 1, the authentication system 110, by communicating with the transaction processing system 106 and/or issuer system 112, authenticates the user 100 based on the account data and registers the user in an authentication database 114. For example, the authentication system 110 may authenticate the user 100 by verifying that the account data is associated with the user 100 and corresponds to a valid, existing account with an issuer institution or the transaction service provider 106. In some non-limiting examples, the authentication system 110 may authenticate the user 100 based on an account type, credit limit, credit score, outstanding invoices, frequency of usage, and/or the like. The user 100, having registered with the authentication system 110, may then use his or her credentials with the authentication system 110 to authenticate himself or herself to the third-party system 108. As an example, the third-party system 108 may be accessed via a webpage or application on the user device 104 and may prompt the user 100, through a GUI 103, to sign-in to the third-party system using the authentication system 110. In such a case, the third-party system 108 may redirect the user device 104 to an application or webpage of the authentication system 110, where the user 100 is prompted to input credentials such as user information (e.g., a user name, password, etc.) and/or account data (e.g., an account identifier, expiration date, security code, etc.). The authentication system 110, in response to authenticating the user by verifying the user information and/or account data, facilitates access to the third-party system 108 by, for example, returning an authorization code to the third-party system 108 and/or user device 104 to allow the user 100 to access the third-party system 108. In some examples, and as described herein, the authentication system 110 may communicate an access token to the third-party system 108 to permit the third-party system 108 to access user information and/or account data that the user authorizes to be shared.

Figure 2:
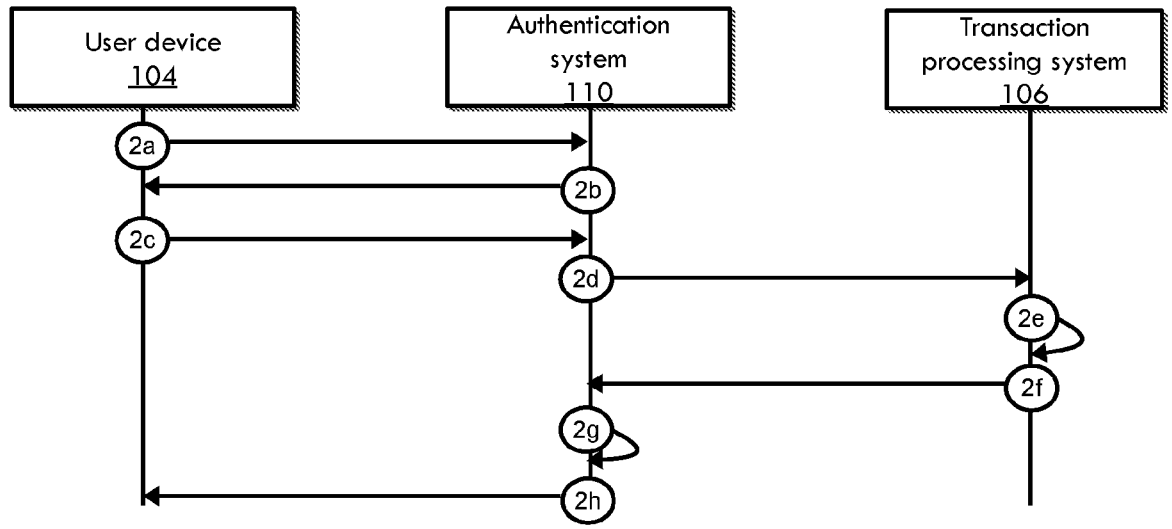
FIG. 2 is a sequence diagram for registering users according to some non-limiting embodiments or aspects.

Referring now to FIG. 2, a sequence diagram is shown for registering users according to some non-limiting embodiments or aspects. At step 2a, a user device 104 accesses the authentication system 110 through a webpage or client application. At step 2b, data is communicated to the user device 104 from the authentication system 110 to present one or more GUIs. A user inputs user information and account data at step 2c. At step 2d, the authentication system 110 communicates an authentication request message to a transaction processing system 106 or issuer system (not shown in FIG. 2) to authenticate the user based on account data provided at step 2d. At step 2e, the transaction processing system 106 determines if the user is authentic based on the account data. For example, the authentication system 110 may authenticate the user 100 based on an account type, credit limit, credit score, outstanding invoices, frequency of usage, and/or the like. At step 2f, the transaction processing system 106 or issuer system returns an authentication response message to the authentication system 110. At step 2g, in response to receiving the authentication response message and/or determining that the account data is valid, the user is registered in an authentication database and an account for the user is created. At step 2h, the authentication system 110 communicates a notification or a redirect message to the user device 104 to redirect the user device to a login page or some other network location.

In some non-limiting embodiments or aspects, a user may access the authentication system 110 through a webpage or client application to manage his or her profile. As an example, a user may add, update, and/or delete user information and/or account data. A user may also select a default portable payment device, report a lost or stolen portable payment device, and set permissions that control how third-party systems may access the user information and/or account data.

Figure 3:
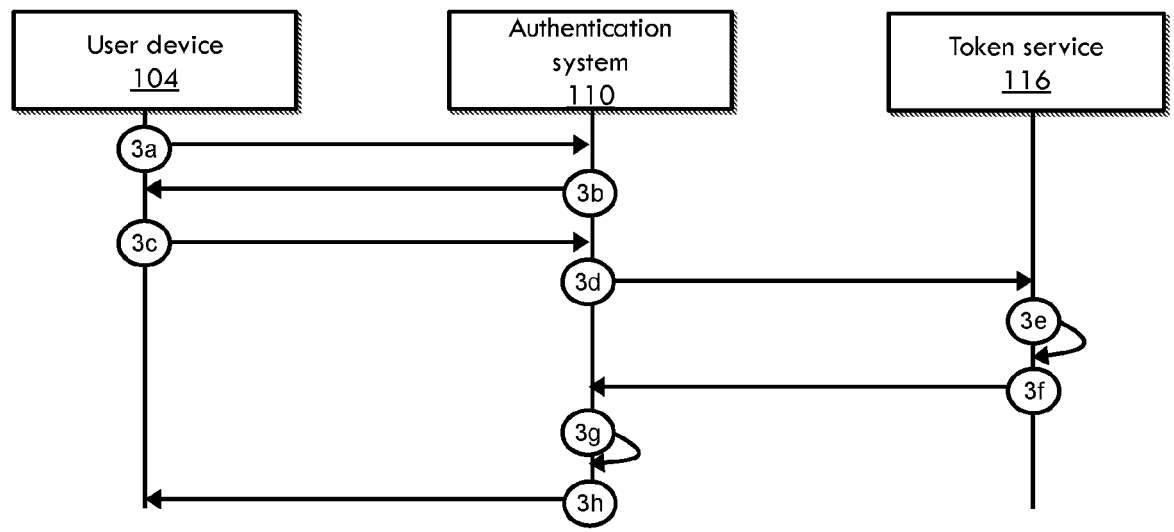
FIG. 3 is a sequence diagram for registering users according to some non-limiting embodiments or aspects.

Referring now to FIG. 3, a sequence diagram is shown for registering users according to some non-limiting embodiments or aspects. The non-limiting embodiment or aspect shown in FIG. 3 utilizes a token service 116 to obscure and prevent exposure of an account identifier. The authentication system 110 may access the token service 116 through one or more application programming interfaces (APIs) and, in some examples, may access the token service 116 through APIs used by electronic wallet providers. Steps 3a-3d in FIG. 3 proceed in accordance with steps 2a-2d explained in connection with FIG. 2. At step 3e, the token service 116, in response to receiving an authentication request message from the authentication system 110, retrieves, generates, or identifies a token corresponding to the account data if the user is authenticated. For example, the token service 116 may request a token from an issuer system corresponding to the account identifier of the user. The token is returned to the authentication system 110 at step 3f. At step 3g, in response to receiving the authentication response message, receiving the token, and/or determining that the account data is valid, the user is registered in an authentication database and an account for the user is created. At step 3h, the authentication system 110 communicates a notification or redirect message to the user device 104 to redirect the user device to a login page or some other network location.

Figure 4:
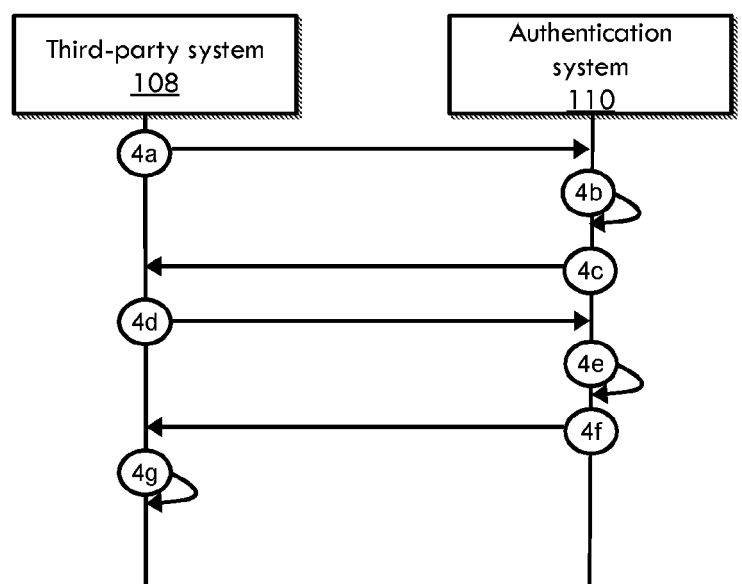
FIG. 4 is a sequence diagram for registering third-party systems according to some non-limiting embodiments or aspects.

Referring now to FIG. 4, a sequence diagram is shown for registering third-party systems according to some non-limiting embodiments or aspects. In some non-limiting embodiments or aspects, third-party systems and/or specific applications may need to register with the authentication system 110 to access one or more APIs. At step 4a, the third-party system 108 communicates a request message to the authentication system 110 to create an account. The request message communicated at step 4a may include, for example, an application name, one or more allowed redirect URLs, required permissions, a third-party service provider identifier, and/or the like. The allowed redirect URLs may be a field in the request message and may include one or more URLs that controls a browser redirect such that requests for authentication having redirect URLs that do not match the allowed redirect URLs may be denied. Required permissions may be a field in the request message and include one or more parameters of user information that the third-party system wants to have access to, such as first name, last name, birth date, address, identity score, and/or the like.

With continued reference to FIG. 4, the authentication system 110 validates the request and creates an account at step 4b, thereby registering the third-party system. A response message is provided to the third-party system 108 at step 4c with credentials, such as a user name, identifier, password, and/or the like. At step 4d, the third-party system communicates a request to register a new application or website. The authentication system 110, at step 4e, generates a unique application identifier and a key. In some non-limiting embodiments or aspects, the unique application identifier and key may be randomly generated using Universal Unique Identifier (UUID) version 4.0, although it will be appreciated that various techniques may be used. The application identifier and key are communicated to the third-party system 108 at step 4f. The third-party system 108 then provides login options to users by embedding the application identifier and key into source code for the application or website. It will be appreciated that various identifiers, keys, and/or other techniques may be used by a third-party system 108 to authenticate and/or identify itself to the authentication system 110 at step 4g.

Figure 5:
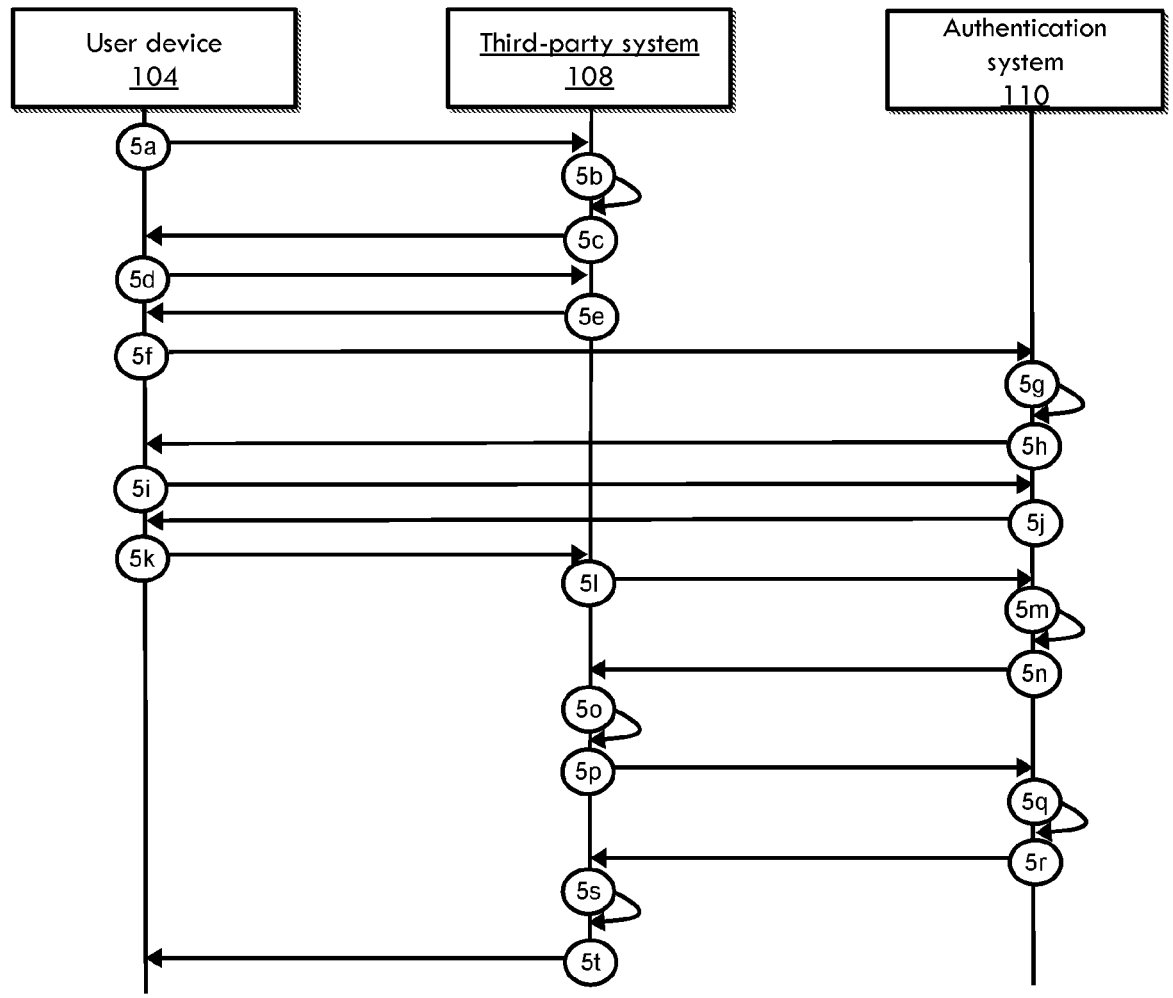
FIG. 5 is a sequence diagram for authenticating a user according to some non-limiting embodiments or aspects.

Referring now to FIG. 5, a sequence diagram is shown for authenticating a user according to some non-limiting embodiments or aspects. At step 5a, the user device 104 communicates a request to the third-party system 108 to create an account. As an example, the user may input user information requested by the third-party system 108 through a GUI, such as an email address, telephone number, name, and/or the like. At step 5b, the third-party system 108 validates the user information. As an example, the third-party system 108 may validate the user's email address or telephone number by sending an email message or text message. At step 5c, the third-party system 108 communicates data to the user device 104 configured to display a message on the user device 104 asking for the user's permission to sign-in or request further information from the authentication system 110. At step 5d, the user may accept by selecting one or more selectable options on a GUI shown on the user device 104. A selectable option may include, for example, one or more buttons, checkboxes, links, radio buttons, drop-down menus, and/or the like.

With continued reference to FIG. 5, upon acceptance by the user, the third-party system 108 may communicate an initial request to authenticate the user. The initial request may be a message that includes, for example, a callback URL. In some examples, the initial request message may be initially communicated to the user device 104 at step 5e in the form of a redirect message to redirect the user device to the authentication system 110. In other examples, the initial request message may be initially communicated to the authentication system 110 which, in response, communicates a redirect message to the user device 104. The callback URL may be passed to the authorization system 110. If the user device 104 is already logged-in to the authentication system 110 through some other means, step 5h may be performed next. Otherwise, at step 5f, the user logs-in to the authentication system 110 using credentials, such as a user name, password, account identifier, and/or the like. At step 5g, the authentication system 110 validates the user's credentials and identifies information for the third-party system 108. At step 5h, the authentication system 110 communicates data to the user device 104 configured to notify the user that the third-party system 108 is requesting access to user information. As an example, one or more required permissions may be displayed in a GUI based on information for the third-party system 108 identifying the required permissions. At step 5*i*, the user may approve for the third-party system 108 to have access to the user information by selecting one or more selectable options on a GUI. In response to receiving the user's approval, the authentication system 110 at step 5*j* redirects the user device 104 back to the third-party system 108 by, for example, communicating a redirect message to the user device 104 including an authorization code and the callback URL specified by the third-party system in the initial authorization request. The authorization code may be stored by the user device 104, for example in memory by a web browser (e.g., as a cookie or otherwise).

Still referring to FIG. 5, at step 5*k* the user device 104 communicates the authorization code to the third-party system 108 to verify that the authentication system 110 has verified the user. At step 5*l*, the third-party system 108 communicates a request for an access token (e.g., an access token request message) to the authentication system 110 including the authorization code, the application identifier, and the key. At step 5*m*, upon receiving the request from the third-party system 108, the authentication system 110 validates the authorization code, application identifier, and key, thereby validating the request from the third-party system 108 as authentic. At step 5*n*, the authentication system 110 communicates an access token to the third-party system 108. The access token may be generated by the authentication system 110 for this particular instance, although it will be appreciated that an access token may also be predefined. The access token may include, for example, a Javascript Object Notation (JSON) Web Token (JWT), although it will be appreciated that various data structures and file types may be used. The access token may also specify, through one or more fields of the token, user information (e.g., a user identifier), an access scope, and an expiration time, as examples.

At step 5*o* of FIG. 5, upon receiving the access token, the third-party system 108 associates the access token with the user account in a database. The third-party system 108 is now able to authenticate the user and/or retrieve user information with the access token. At step 5*p*, the third-party system 108 communicates a request to authenticate the user to the authentication system 110 that includes the access token. As an example, when the third-party system 108 makes a call to an API of the authorization system 110, the access token may be in an HTTP request header of the API call. At step 5*q*, the authentication system 110 validates the access token and the requested permissions. As an example, the authentication system 110 may determine that the access token is valid by analyzing a digital signature of the access token. Upon validating the access token, at step 5*r*, user information is communicated to the third-party system 108. The user information is stored by the third-party system 108 and the third-party system 108 creates an account for the user at step 5*s* and, at step 5*t*, the third-party system 108 notifies user that the process has been completed.

In some non-limiting embodiments or aspects, the authentication system 110 generates an identity score for the users. Users of the authentication system 110 may therefore be classified based on their identity scores. A variety of different parameters may be used to generate an identity score. In some examples, an identity score may be calculated based on an account verification score, an account type score, a credit score, an account usage score, and an issuer identity verification score. However, it will be appreciated that any account data and/or user information may be used to generate an identity score, such as how frequently the user utilizes the authorization system 110 and/or portable payment device, the number of third-party systems the user has signed-up with using the authorization system 110, the user's credit score, and/or the like. As an example, an identity score may be calculated by summing an account verification score, an account type score, a credit score, an account usage score, and an issuer identity verification score.

In some non-limiting embodiments or aspects, the identity score of a user is based at least partially on an account verification score of the user. The account verification score may assign a point value to a number of parameters, such as a verified PAN (e.g., 100 points), a verified security code (e.g., 100 points), and verified user information (e.g., name, address, country, state, zip code, etc.) (e.g., 100 points). Accordingly, with these examples, a user's account verification score may range from 0-300. It will be appreciated that the account verification score may be within any range, that any point values may be assigned to different parameters, and that the score may be binary (e.g., 1 or 0) in some examples. The account verification score and/or the parameters used to calculate such a score may be obtained from a transaction provider system and/or issuer system corresponding to the user's portable payment device.

In some non-limiting embodiments or aspects, the identity score of a user is based at least partially on an account type score. The account type score may be point values assigned to different types of portable payment devices, such as a platinum card (e.g., 50 points), a signature card (e.g., 80 points), an infinite card (e.g., 100 points). The account type score may be based on the account type and the associated credit limits for such account types. A higher credit limit may indicate that a stricter background check was already performed by an issuer institution. It will be appreciated that the account type score may be generated based on any account data or user information associated with an account type, such as not but not limited to an issuer institution that issued the portable payment device.

In some non-limiting embodiments or aspects, the identity score of a user is based at least partially on a credit score. A credit score verification process may verify the credibility of a user using a FICO® Score and associated rating scales, as an example. In some examples, the credit score may be calculated based on following criteria: 35% payment history (e.g., 70 points), 30% amount owed (e.g., 60 points), 15% length of history (e.g., 30 points), 10% new credit (e.g., 20 points), 10% types of credit used (e.g., 20 points), for a total range of 0-200 points. It will be appreciated that a credit score may be calculated in various ways and with various parameters, and may have any type of point value assigned to it.

In some non-limiting embodiments or aspects, the identity score of a user is based at least partially on an account usage score. An account usage verification process may verify the usage of a portable payment device in terms of the frequency of usage (e.g., 100 points), the amount of money spent on the card (e.g., 50 points), and the length of the existence of the card (e.g., 50 points), for a total range of 0-200 points. It will be appreciated that an account usage score may be calculated in various ways and with various parameters and may have any type of point value assigned to it.

In some non-limiting embodiments or aspects, the identity score of a user is based at least partially on an issuer identity verification score. An issuer identity verification process may verify a user's identity by utilizing background check data from an issuer system corresponding to an issuer institution that issued the portable payment device to the user, namely, a national identifier (e.g., 50 points), a phone number (e.g., 50 points), an email address (e.g., 50 points), and a billing address (e.g., 50 points), for a total range of 0-200 points. It will be appreciated that an issuer identity verification score may be calculated in various ways and with various parameters, and may have any type of point value assigned to it.

Based on the types of parameters used, an identity score for a user may fall anywhere within a predetermined range. For example, using the example parameters above, an identity score may be within 0-700 points. In some non-limiting embodiments or aspects, the authentication system 110 may define a plurality of different levels or categories to classify different users based on their respective identity scores. As an example, Level 1 may include users having an identity score less than 300, Level 2 may include users having an identity score greater or equal to 300 and less than 700, Level 3 may include users having an identity score of 700 or greater, and Level 4 may include users having two or more accounts (e.g., two or more portable payment devices) that each qualify as Level 3. It will be appreciated that various categories may be used to group users based on their identity scores. In some non-limiting embodiments or aspects, third-party systems 108 may specify a required level or category for a user identity score before creating an account for that user. For example, a social network application may allow users to sign-up that have a Level 1 or above identity score, a sharing economy application (e.g., Uber®, Airbnb®, etc.) may allow users to sign-up that have a Level 2 or above identity score, and a financial investment platform may only allow users to sign-up that have a Level 3 or above identity score and may require a Level 4 identity score for enhanced trading limits and/or other privileges. It will be appreciated that third-party systems 108 may also grant permissions and/or privileges based on the user's identity score.

Figure 6:
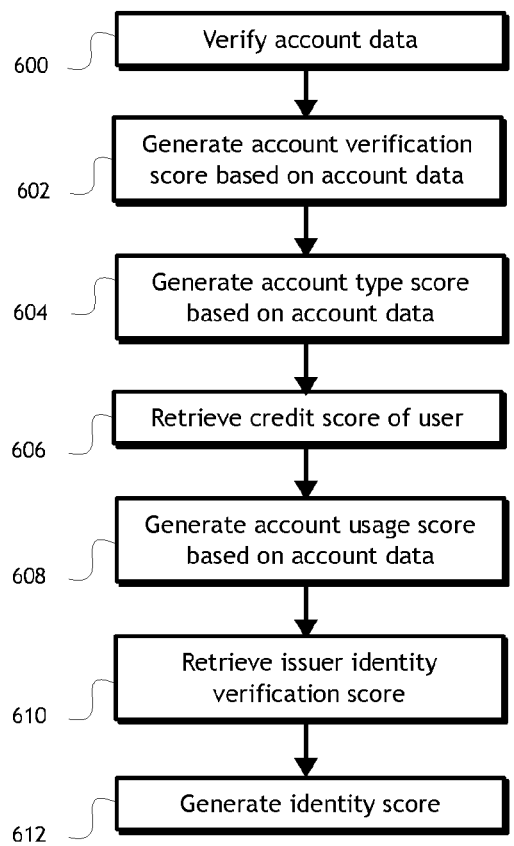
FIG. 6 is flow diagram for generating an identity score according to some non-limiting embodiments or aspects.

Referring now to FIG. 6, a flow diagram is shown for generating an identity score according to some non-limiting embodiments or aspects. At a first step 600, account data for a user is verified such as, for example, an account identifier, expiration date, security code, billing address or postal code, and/or the like. At step 602, an account verification score is generated based on the account data. The account verification score and/or the parameters used to calculate such a score may be obtained from a transaction provider system and/or issuer system corresponding to the user's portable payment device. At step 604, an account type score is generated based on the account data. The account type score may be based on the account type and the associated credit limits for such account types. At step 606, a credit score of the user may be retrieved from a credit reporting agency, an issuer system, and/or the like. The credit score may also be generated by the authorization system based on credit data for the user. At step 608, an account usage score is generated for the user based on the account data. The account usage score may be based on a frequency of account usage, total or average transaction values, lifespan of the account, and/or the like. At step 610, an issuer identity verification score may be retrieved from one or more issuer systems corresponding to issuer institutions that have issued accounts to the user. At step 612, an identity score for the user is generated based on the account verification score, account type score, credit score, account usage score, and the issuer identity verification score. The identity score may be used to automatically classify the user based on a plurality of predefined categories. Moreover, the predefined categories may be used by the third-party system to accept or reject the user.

In a non-limiting example, and referring back to FIG. 1, the authentication system 110 may provide an identity score service that is accessible by third-party systems 108 having the user's permission. In such examples, the third-party system 108 may utilize the authentication system 110 to determine if the user is trusted and/or if the user qualifies for certain services based on his or her identity score. In some examples, the user 100 may maintain accounts with a plurality of issuer institutions and his or her identity score may be based on information from each issuer institution. In such examples, the authorization system 110 may aggregate transaction data from each of the issuer systems 112 in real-time or at intervals, updating each user's identity score as appropriate. Machine learning and predictive modeling techniques may also be applied to analyze users' transaction histories and account profiles for generating and/or adjusting an identity score. In some non-limiting embodiments or aspects, the identity score service may be provided by one or more issuer systems 112.

Figure 7:
FIG. 7 is a graphical user interface (GUI) provided by a third-party system according to some non-limiting embodiments or aspects.

Referring now to FIG. 7, a GUI 700 provided by a third-party service provider is shown according to some non-limiting embodiments or aspects. The GUI 700 includes a selectable option 702 that, when selected by a user, redirects the user device to the authentication system. A user may choose the selectable option 702 on the GUI 700 in order to create an account using credentials already created for the authentication system, even though the user may not have an account with the third-party service provider.

Figure 8:
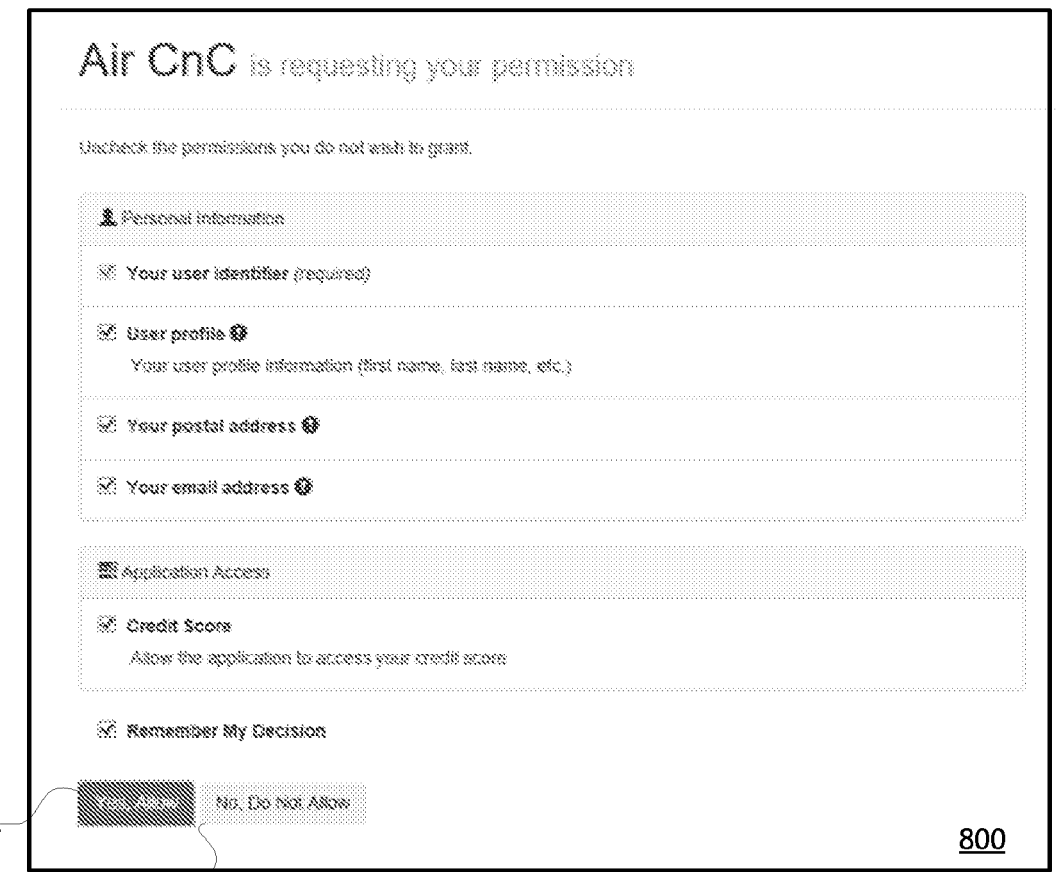
FIG. 8 is a GUI provided by an authentication system according to some non-limiting embodiments or aspects.

Referring now to FIG. 8, a GUI 800 provided by an authentication system is shown according to some non-limiting embodiments or aspects. The GUI 800 may be displayed to a user that is redirected from the GUI 700 shown in FIG. 7 after choosing the selectable option 702. The GUI 800 includes selectable options 802, 804 to receive user input permitting or denying the authentication system to provide user information and/or account data to the requesting third-party service provider. Further, a user may select one or more other selectable options to choose what user information and/or account data may be provided. In some examples, the third-party service provider may specify user information and/or account data that is required. If the user permits the authentication system to provide user information and/or account data to the requesting third-party service provider by choosing the selectable option 802, the user's device may be redirected to the GUI 900 shown in FIG. 9. If the user does not permit the authentication system to provide user information and/or account data to the requesting third-party service provider by choosing the selectable option 804, the user's device may be redirected back to the third-party service provider.

Figure 9:
FIG. 9 is another GUI provided by a third-party system according to some non-limiting embodiments or aspects.

Referring now to FIGS. 8 and 9, if the user selects the selectable option 802 on GUI 800, the user may be directed to GUI 900 shown in FIG. 9 which is provided by the third-party service provider (e.g., hosted by a third-party system) and displays the user information and/or account data that the user permitted in the GUI 800 shown in FIG. 8. The GUI 900 includes a selectable option 902 for the user to confirm the user information and/or account data and to create an account with the third-party service provider. It will be appreciated that the GUIs 700, 800, 900 shown in FIGS. 7-9 are for example only and that numerous designs and types of GUIs may be utilized.

Although examples have been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method for authenticating a user, comprising:

registering, by an authentication system, a plurality of user accounts for a plurality of users in at least one data structure based at least partially on user information and account data for each user of the plurality of users, the account data for each user comprising an account identifier associated with a portable payment device, wherein the account identifier comprises at least a primary account number (PAN) associated with a user account for each user;

generating, by the authentication system, an identity score for each user based on the PAN associated with the user account for each user;

receiving, by the authentication system, at least one message requesting to create a plurality of provider accounts for a plurality of third-party service providers, the at least one message comprising a required permissions field, the required permissions field comprising one or more parameters of user information and the PAN associated with the user account for each user requested by a third-party system;

registering, by the authentication system, the plurality of provider accounts for the plurality of third-party service providers in at least one data structure based at least partially on third-party service provider data;

receiving, from the third-party system corresponding to a third-party service provider of the plurality of third-party service providers, an initial request to authenticate a user of the plurality of users, the initial request communicated in response to the user creating an account with the third-party service provider;

redirecting a device associated with the user to a webpage of the authentication system comprising a first graphical user interface configured to receive a first input from the user;

receiving, from the device associated with the user, the first input from the user comprising user credentials corresponding to a first user account of the plurality of user accounts;

validating, by the authentication system, the user credentials based at least partially on the identity score for the user;

redirecting the device associated with the user to a webpage of the authentication system comprising a second graphical user interface configured to receive a second input from the user;

receiving, from the device associated with the user, the second input from the user comprising an approval for the third-party system to identify the one or more parameters of user information and the PAN associated with the user account of the user requested by the third-party system;

in response to receiving the second input from the user, communicating, by the authentication system, a redirect message to the device associated with the user, the redirect message comprising an authentication code, the redirect message configured to redirect the device associated with the third-party system;

storing the authentication code on the device associated with the user via a browser application executing on the device associated with the user based on receiving the redirect message;

receiving, from the third-party system, an access token request message comprising an authorization code and third-party service provider data;

validating, by the authentication system, the access token request message;

in response to validating the access token request message, generating, by the authentication system, an access token based at least partially on the authorization code and the third-party service provider data;

communicating, by the authentication system, the access token to the third-party system;

receiving, by the authentication system, a second request to authenticate the user from the third-party system, wherein the second request to authenticate the user comprises the access token;

validating, by the authentication system, the access token by analyzing a digital signature of the access token; and communicating, by the authentication system to the third-party system, the one or more parameters of user information and the PAN associated with the first user account requested by the third-party system to the third-party system based on validating the access token.

2. The computer-implemented method of claim 1, wherein generating the identity score for each user is based at least partially on at least one of the following: an account type, a credit score, an account usage, or any combination thereof.

3. The computer-implemented method of claim 1, wherein generating the identity score for each user is based at least partially on an account verification score of the user, the account verification score based at least partially on at least two of the following parameters: a verified PAN, a verified security code, verified user information, or any combination thereof.

4. The computer-implemented method of claim 1, wherein generating the identity score for each user is based at least partially on a credit score of the user.

5. The computer-implemented method of claim 1, wherein generating the identity score for each user is based at least partially on an account usage score of the user, the account usage score based at least partially on at least one of the following: a frequency of usage of a portable payment device, an amount spent with the portable payment device, an age of the portable payment device, or any combination thereof.

6. The computer-implemented method of claim 1, wherein validating the user credentials comprises determining if the identity score for the user satisfies a threshold.

7. The computer-implemented method of claim 1, wherein the second request to authenticate the user is received subsequent to the initial request to authenticate the user.

8. The computer-implemented method of claim 1, wherein the redirect message comprises a callback URL, and wherein the initial request to authenticate the user comprises the callback URL.

9. The computer-implemented method of claim 1, wherein each account identifier comprises a token corresponding to a PAN, and wherein registering each user of the plurality of users in the at least one data structure comprises:

generating the token based on the PAN; and storing the token in the at least one data structure in relation to user data.

10. An authentication system, comprising:
an authentication database; and
at least one server computer including at least one processor programmed or configured to:
  register a plurality of user accounts for a plurality of users in the authentication database based at least partially on user information and account data for each user of the plurality of users, the account data for each user comprising an account identifier associated with a portable payment device, wherein the account identifier comprises at least a primary account number (PAN) associated with a user account for each user;
  generate an identity score for each user of the plurality of users based on the PAN associated with the user account for each user;
  receive at least one message requesting to create a plurality of provider accounts for a plurality of third-party service providers, the at least one message comprising a required permissions field, the required permissions field comprising one or more parameters of user information and the PAN associated with the user account for each user requested by a third-party system;
  register the plurality of provider accounts for the plurality of third-party service providers in the authentication database based at least partially on third-party service provider data;
  receive, from the third-party system corresponding to a third-party service provider of the plurality of third-party service providers, an initial request to authenticate a user of the plurality of users, the initial request communicated in response to the user creating an account with the third-party service provider;
  redirect a device associated with the user to a webpage of the authentication system comprising a first graphical user interface configured to receive a first input from the user;
  receive, from the device associated with the user, the first input from the user comprising user credentials corresponding to a first user account of the plurality of user accounts;
  validate the user credentials based at least partially on the identity score of the user;
  redirect the device associated with the user to a webpage of the authentication system comprising a second graphical user interface configured to receive a second input from the user;
  receive the second input from the user comprising an approval for the third-party system to identify the one or more parameters of user information and the PAN associated with the user account of the user requested by the third-party system;
  in response to receiving the second input from the user, communicate a redirect message to the device associated with the user, the redirect message comprising an authentication code, the redirect message configured to redirect the device associated with the third-party system;
  store the authentication code on the device associated with the user via a browser application executing on the device associated with the user based on receiving the redirect message;
  receive, from the third-party system, an access token request message comprising an authorization code and third-party service provider data;
  validate the access token request message;
  in response to validating the access token request message, generate an access token based at least partially on the authorization code and the third-party service provider data;
  communicate the access token to the third-party system;
  receive a second request to authenticate the user from the third-party system, wherein the second request to authenticate the user comprises the access token;
  validate the access token by analyzing a digital signature of the access token; and
  communicate the one or more parameters of user information and the PAN associated with the first user account requested by the third-party system to the third-party system based on validating the access token.

11. The authentication system of claim 10, wherein generating the identity score for each user is based at least partially on at least one of the following: an account type, a credit score, an account usage, or any combination thereof.

12. The authentication system of claim 10, wherein generating the identity score for each user is based at least partially on an account verification score of the user, the account verification score based at least partially on at least two of the following parameters: a verified PAN, a verified security code, verified user information, or any combination thereof.

13. The authentication system of claim 10, wherein generating the identity score for each user is based at least partially on a credit score of the user.

14. The authentication system of claim 10, wherein generating the identity score for each user is based at least partially on an account usage score of the user, the account usage score based at least partially on at least one of the following: a frequency of usage of a portable payment device, an amount spent with the portable payment device, an age of the portable payment device, or any combination thereof.

15. A computer program product for authenticating a user, comprising at least one non-transitory computer-readable medium including program instructions that, when executed by at least one processor, cause the at least one processor to:
  register a plurality of user accounts for a plurality of users in an authentication database based at least partially on user information and account data for each user of the plurality of users, the account data for each user comprising an account identifier associated with a portable payment device, wherein the account identifier comprises at least a primary account number (PAN) associated with a user account for each user;
  generate an identity score for each user of the plurality of users based on the PAN associated with the user account for each user;
  receive at least one message requesting to create a plurality of provider accounts for a plurality of third-party service providers, the at least one message comprising a required permissions field, the required permissions field comprising one or more parameters of user information and the PAN associated with the user account for each user requested by a third-party system;

register the plurality of provider accounts for the plurality of third-party service providers in the authentication database based at least partially on third-party service provider data;

receive, from the third-party system corresponding to a third-party service provider of the plurality of third-party service providers, an initial request to authenticate a user of the plurality of users, the initial request communicated in response to the user creating an account with the third-party service provider;

redirect a device associated with the user to a webpage of an authentication system comprising a first graphical user interface configured to receive a first input from the user;

receive, from the device associated with the user, the first input from the user comprising user credentials corresponding to a first user account of the plurality of user accounts;

validate the user credentials based at least partially on the identity score of the user;

redirect the device associated with the user to a webpage of the authentication system comprising a second graphical user interface configured to receive a second input from the user;

receive the second input from the user comprising an approval for the third-party system to identify the one or more parameters of user information and the PAN associated with the user account of the user requested by the third-party system;

in response to receiving the second input from the user, communicate a redirect message to the device associated with the user, the redirect message comprising an authentication code, the redirect message configured to redirect the device associated with the third-party system;

store the authentication code on the device associated with the user via a browser application executing on the device associated with the user based on receiving the redirect message;

receive, from the third-party system, an access token request message comprising an authorization code and third-party service provider data;

validate the access token request message;

in response to validating the access token request message, generate an access token based at least partially on the authorization code and the third-party service provider data;

communicate the access token to the third-party system;

receive a second request to authenticate the user from the third-party system, wherein the second request to authenticate the user comprises the access token;

validate the access token by analyzing a digital signature of the access token; and communicate the one or more parameters of user information and the PAN associated with the first user account requested by the third-party system to the third-party system-based on validating the access token.

16. The computer-implemented method of claim 1, wherein the authentication code is stored as a cookie in memory of the browser application.

17. The computer-implemented method of claim 1, wherein the access token comprises at least one data structure including one or more fields specifying at least an expiration time.

18. The authentication system of claim 10, wherein the access token comprises at least one data structure including one or more fields specifying at least and an expiration time.

19. The computer program product of claim 15, wherein the access token comprises at least one data structure including one or more fields specifying at least an expiration time.

* * * * *